(12) United States Patent
Chen et al.

(10) Patent No.: US 7,551,430 B2
(45) Date of Patent: *Jun. 23, 2009

(54) HANDHELD COMPUTING DEVICE HAVING DROP-RESISTANT LCD DISPLAY

(75) Inventors: Chao Chen, Waterloo (CA); Felipe Oliveira Simoes, Kitchener (CA); John Holmes, Waterloo (CA)

(73) Assignee: Research In Motion Limited, Waterloo, ON (*) Notice: Subject to any disclaimer, the term of this patent is extended or adjusted under 35 U.S.C. 154(b) by 0 days.

This patent is subject to a terminal disclaimer.

(21) Appl. No.: 11/526,878

(22) Filed: Sep. 26, 2006

(65) Prior Publication Data

US 2007/0070589 A1 Mar. 29, 2007

Related U.S. Application Data

(63) Continuation of application No. 10/857,968, filed on Jun. 2, 2004, now Pat. No. 7,130,185.

(51) Int. Cl.
*G06F 1/16* (2006.01)
(52) U.S. Cl. .......................... 361/681; 349/58; 362/561
(58) Field of Classification Search .................. 349/58, 349/60, 62, 65, 69–70; 368/87, 242; 362/561; 361/679–687, 724–727
See application file for complete search history.

(56) References Cited

U.S. PATENT DOCUMENTS

| | | | | | |
|---|---|---|---|---|---|
| 3,918,052 | A | * | 11/1975 | Bricher | 345/32 |
| 4,283,784 | A | * | 8/1981 | Horan | 368/87 |
| 4,422,728 | A | | 12/1983 | Andreaggi | |
| 5,936,600 | A | | 8/1999 | Ohashi et al. | |
| 6,654,232 | B1 | * | 11/2003 | Tsao et al. | 361/681 |
| 6,697,130 | B2 | * | 2/2004 | Weindorf et al. | 349/65 |
| 7,016,186 | B2 | * | 3/2006 | Ueda et al. | 361/683 |
| 7,130,185 | B2 | * | 10/2006 | Chen et al. | 361/681 |

FOREIGN PATENT DOCUMENTS

| | | |
|---|---|---|
| EP | 0642089 A1 | 3/1995 |
| EP | 0947910 A2 | 4/1999 |
| GB | 2190529 A | 5/1997 |
| JP | 11-109340 | 4/1999 |

* cited by examiner

*Primary Examiner*—Hung V Duong
(74) *Attorney, Agent, or Firm*—Heenan Blaikie LLP

(57) ABSTRACT

A display for a handheld computing device includes a LCD display panel; a display circuit board carrying display electronics for the display panel; a cover assembly securing the display panel to the display circuit board; and a resilient layer disposed between the display circuit board and a circuit board of the computing device. The resilient layer is configured to support the display panel and to limit impact forces applied to the display panel.

22 Claims, 4 Drawing Sheets

HANDHELD COMPUTING DEVICE HAVING DROP-RESISTANT LCD DISPLAY

CROSS-REFERENCE TO RELATED APPLICATIONS

This patent application is a continuation of U.S. patent application Ser. No. 10/857,968, entitled "Handheld Computing Device Having Drop-Resistant LCD Display", filed Jun. 2, 2004 now U.S. Pat. No. 7,130,185.

FIELD OF THE INVENTION

The invention described herein relates to a handheld computing device. In particular, the invention described herein relates to a configuration for a handheld computing device having a LCD display that is resistant to shock loading damage due to impact.

BACKGROUND OF THE INVENTION

The conventional handheld computing device, such as a PDA, or a wireless telephone, includes a keyboard/keypad, a display assembly and a system motherboard (not shown) contained within a common housing. The display assembly is typically provided as a reflective, transmissive or transreflective LCD display panel.

To limit power losses and the effects of noise on image quality, the LCD display electronics must be disposed in close proximity to the LCD display panel. Accordingly, the LCD display electronics are provided on a printed circuit board that is housed within a plastic or metal support frame, together with the LCD display panel. Typically, the display electronics and the LCD display panel are press-fitted within the frame, and the frame is secured to the motherboard with permanent adhesive or screws.

The LCD display panel is prone to damage resulting from shock loading due to impact. Since the LCD display panel is fixed within the support frame, and the support frame is secured to the motherboard, the LCD display panel can sustain shock impact damage if the handheld computing device is struck or dropped.

Further, in view of the method by which the LCD display panel and the LCD display electronics are assembled together, typically the entire display assembly must be discarded if the LCD display panel becomes damaged. As a result, repairs cost are often excessively high.

Therefore, there is a need for a configuration for a handheld computing device that reduces the sensitivity of the LCD display panel to jarring impact damage. Further, there is a need for a configuration for a handheld computing device that reduces the repair costs of the display assembly.

SUMMARY OF THE INVENTION

According to one aspect of the invention described herein, there is provided a display for a handheld computing device. The display includes a LCD display panel; a display circuit board that carries display electronics for the display panel; a cover assembly securing the display panel to the display circuit board; and a resilient layer disposed between the display circuit board and a circuit board of the computing device. The resilient layer is configured to support the display panel and to limit impact forces applied to the display panel.

According to another aspect of the invention described herein, there is provided a handheld computing device that includes a motherboard; and a display resiliently secured to the motherboard The display comprises a LCD display panel; a display circuit board carrying display electronics for the display panel; a cover assembly securing the display panel to the display circuit board; and a resilient layer disposed between the display circuit board and the motherboard. The resilient layer is configured to support the display panel and to limit impact forces applied to the display panel.

Preferably, the resilient layer is configured to cause the applied impact forces to be applied substantially uniformly to the display panel. The resilient layer is also configured to limit the support of the display panel at the centre of the display panel.

Preferably, the resilient layer has a first adhesive surface adhering the resilient layer to the display circuit board, and a second adhesive surface adhering the display to the motherboard. One of the adhesive surfaces is configured to cause the impact forces to be applied substantially uniformly to the display panel. The one adhesive surface comprises adhesive disposed symmetrically along the one adhesive surface.

Further, preferably the display also includes a backlight, and a light guide frame disposed between the backlight and the display panel. The light guide frame includes at least one snap clip securing the display to the motherboard. The snap clip is configured to allow the display to move relative to the motherboard.

In one implementation, the resilient layer comprises a urethane foam layer. The adhesive is disposed at opposite ends of the one adhesive surface. The resilient layer also has an opening proximate its centre region for supporting the display panel only along the outer peripheral region of the display panel. The snap clip loosely engages an edge of the motherboard. The light guide frame also has at least one guide pin aligning the display with the motherboard. The guide pin is received within a corresponding hole of the motherboard and is dimensioned to facilitate the relative movement.

BRIEF DESCRIPTION OF THE DRAWINGS

The invention will now be described, by way of example only, with reference to the accompanying drawings, in which.

DETAILED DESCRIPTION OF THE PREFERRED EMBODIMENT

Figure 1:
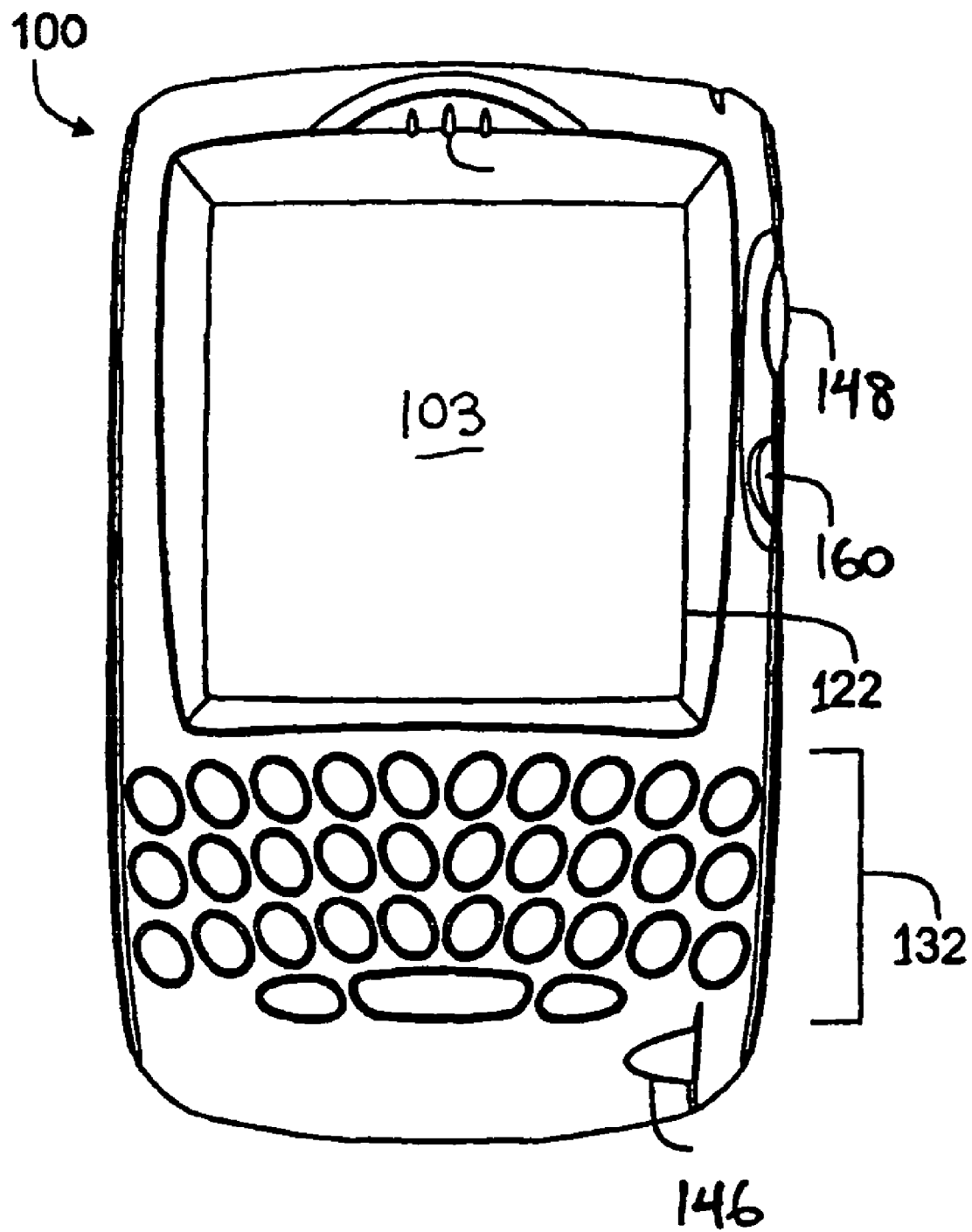
FIG. 1 is a front plan view of a handheld computing device, according to the invention described herein.

Referring now to FIG. 1, there is shown a handheld computing device, denoted generally as 100, provided according to one aspect of the invention. The handheld computing device 100 includes a display 122, a function key 146 and a system motherboard 102 (not shown) disposed within a common housing. The display 122 is a self-contained peripheral device that is connected to the system motherboard.

The function key 146 functions as a power on/off switch for the handheld computing device 100, and may also function as a backlight key for the display 122.

In addition to the display 122 and the function key 146, the handheld computing device 100 includes user data input means for inputting data to the data processing means. As shown, preferably the user data input means includes a keyboard 132, a thumbwheel 148 and an escape key 160.

Typically, the handheld computing device 100 is a two-way wireless communication device having at least voice and data communication capabilities. Further, preferably the handheld computing device 100 has the capability to communicate with other computer systems over the Internet. Depending on the exact functionality provided, the wireless handheld computing device 100 may be referred to as a data messaging device, a two-way pager, a wireless e-mail device, a cellular telephone with data messaging capabilities, a wireless Internet appliance, or a data communication device, as examples.

Figure 2:
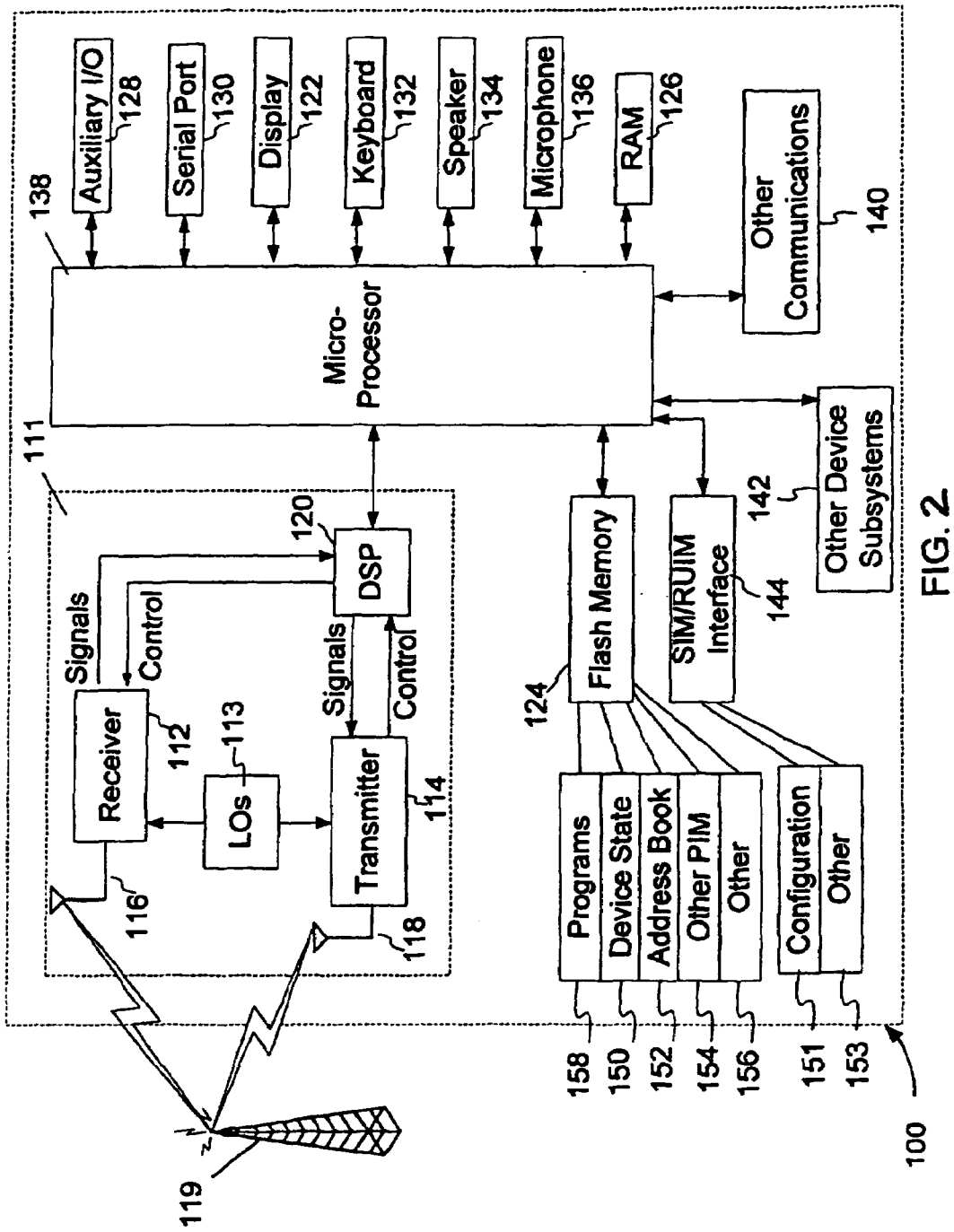
FIG. 2 is a schematic view depicting functional details of the handheld computing device.

FIG. 2 depicts functional details of the handheld computing device 100. Where the handheld computing device 100 is enabled for two-way communication, the motherboard 102 will incorporate a communication subsystem 111, including both a receiver 112 and a transmitter 114, as well as associated components such as one or more, preferably embedded or internal, antenna elements 116 and 118, local oscillators (LOs) 113, and a processing module such as a digital signal processor (DSP) 120. As will be apparent to those skilled in the field of communications, the particular design of the communication subsystem 111 will be dependent upon the communication network in which the device is intended to operate. For example, the handheld computing device 100 may include a communication subsystem 111 designed to operate within the Mobitex™ mobile communication system, the DataTAC™ mobile communication system, GPRS network, UMTS network, EDGE network or CDMA network.

Network access requirements will also vary depending upon the type of network 119. For example, in the Mobitex and DataTAC networks, the handheld computing device 100 is registered on the network using a unique identification number associated with each handheld computing device. In UMTS and GPRS networks, and in some CDMA networks, however, network access is associated with a subscriber or user of the handheld computing device 100. A GPRS handheld computing device therefore requires a subscriber identity module (SIM) card in order to operate on a GPRS network, and a RUIM in order to operate on some CDMA networks. Without a valid SIM/RUIM card, a GPRS/UMTS/CDMA handheld computing device may not be fully functional. Local or non-network communication functions, as well as legally required functions (if any) such as "911" emergency calling, may be available, but the handheld computing device 100 will be unable to carry out any other functions involving communications over the network. The SIM/RUIM interface 144 is normally similar to a card-slot into which a SIM/RUIM card can be inserted and ejected like a diskette or PCMCIA card. The SIM/RUIM card can have approximately 64 K of memory and hold many key configuration 151, and other information 153 such as identification, and subscriber related information.

When required network registration or activation methods have been completed, the handheld computing device 100 may send and receive communication signals over the network 119. Signals received by antenna 116 through communication network 119 are input to receiver 112, which may perform such common receiver functions as signal amplification, frequency down conversion, filtering, channel selection and the like, and in the example system shown in FIG. 2, analog to digital (A/D) conversion. A/D conversion of a received signal allows more complex communication functions such as demodulation and decoding to be performed in the DSP 120. In a similar manner, signals to be transmitted are processed, including modulation and encoding for example, by DSP 120 and input to transmitter 114 for digital to analog conversion, frequency up conversion, filtering, amplification and transmission over the communication network 119 via antenna 118. DSP 120 not only processes communication signals, but also provides for receiver and transmitter control. For example, the gains applied to communication signals in receiver 112 and transmitter 114 may be adaptively controlled through automatic gain control algorithms implemented in DSP 120.

The handheld computing device 100 preferably includes a microprocessor 138 which controls the overall operation of the device. Communication functions, including at least data and voice communications, are performed through communication subsystem 111. Microprocessor 138 also interacts with further device subsystems such as the display 122, flash memory 124, random access memory (RAM) 126, auxiliary input/output (110) subsystems 128, serial port 130, keyboard 132, speaker 134, microphone 136, a short-range communications subsystem 140 and any other device subsystems generally designated as 142.

Typically, the communication subsystem 111, flash memory 124, RAM 126, I/O subsystems 128, serial port 130, keyboard 132, speaker 134, microphone 136, microprocessor 138, and the subsystems 140, 142 are provided on the motherboard 102, and the display 122 is provided as a self-contained unit that is physically mounted, and electrically connected, to the motherboard 102. This aspect of the invention will be discussed in further detail below.

Some of the subsystems shown in FIG. 2 perform communication-related functions, whereas other subsystems may provide "resident" or on-device functions. Some subsystems, such as keyboard 132 and display 122, for example, may be used for both communication-related functions, such as entering a text message for transmission over a communication network, and device-resident functions such as a calculator or task list.

The operating system software used by the microprocessor 138 is preferably stored in a persistent store such as flash memory 124, which may instead be a read-only memory (ROM) or similar storage element (not shown). Those skilled in the art will appreciate that the operating system, specific device applications, or parts thereof, may be temporarily loaded into a volatile memory such as RAM 126. Received communication signals may also be stored in RAM 126.

As shown, the flash memory 124 can be segregated into different areas for both computer programs 158 and program data storage 150, 152, 154 and 156. These different storage areas indicate that each program can allocate a portion of flash memory 124 for their own data storage requirements. In addition to its operating system functions, preferably the microprocessor 138 enables execution of software applications on the handheld computing device. A predetermined set of applications that control basic operations, will normally be installed on the handheld computing device 100 during manufacturing. One set of basic software applications might perform data and/or voice communication functions, for example.

A preferred software application may be a personal information manager (PIM) application having the ability to organize and manage data items relating to the user of the handheld computing device such as, but not limited to, e-mail, calendar events, voice mails, appointments, and task items.

Naturally, one or more memory stores would be available on the handheld computing device to facilitate storage of PIM data items. Such PIM application would preferably have the ability to send and receive data items, via the wireless network 119. In a preferred embodiment, the PIM data items are seamlessly integrated, synchronized and updated, via the wireless network 119, with the user's corresponding data items stored or associated with a host computer system.

Further applications may also be loaded onto the handheld computing device 100 through the network 119, an auxiliary I/O subsystem 128, serial port 130, short-range communications subsystem 140 or any other suitable subsystem 142, and installed by a user in the RAM 126 or preferably a non-volatile store (not shown) for execution by the microprocessor 138. Such flexibility in application installation increases the functionality of the device and may provide enhanced on-device functions, communication-related functions, or both. For example, secure communication applications may enable electronic commerce functions and other such financial transactions to be performed using the handheld computing device 100.

In a data communication mode, a received signal such as a text message or web page download will be processed by the communication subsystem 111 and input to the microprocessor 138, which preferably further processes the received signal for output to the display 122, or alternatively to an auxiliary I/O device 128. A user of the handheld computing device 100 may also compose data items such as email messages for example, using the keyboard 132, which is preferably a complete alphanumeric keyboard or telephone-type keypad, in conjunction with the display 122 and possibly an auxiliary I/O device 128. Such composed items may then be transmitted over a communication network through the communication subsystem 111.

For voice communications, overall operation of the handheld computing device 100 is similar, except that received signals would preferably be output to a speaker 134 and signals for transmission would be generated by a microphone 136. Alternative voice or audio I/O subsystems, such as a voice message recording subsystem, may also be implemented on the handheld computing device 100. Although voice or audio signal output is preferably accomplished primarily through the speaker 134, display 122 may also be used to provide an indication of the identity of a calling party, the duration of a voice call, or other voice call related information for example.

Serial port 130 in FIG. 2, would normally be implemented in a personal digital assistant (PDA)-type handheld computing device for which synchronization with a user's desktop computer (not shown) may be desirable. The serial port 130 enables a user to set preferences through an external device or software application and would extend the capabilities of the handheld computing device 100 by providing for information or software downloads to the handheld computing device 100 other than through a wireless communication network.

Other communications subsystems 140, such as a short-range communications subsystem, is a further optional component which may provide for communication between the handheld computing device 100 and different systems or devices, which need not necessarily be similar devices. For example, the subsystem 140 may include an infrared device and associated circuits and components or a Bluetooth™ communication module to provide for communication with similarly enabled systems and devices.

Figure 3:
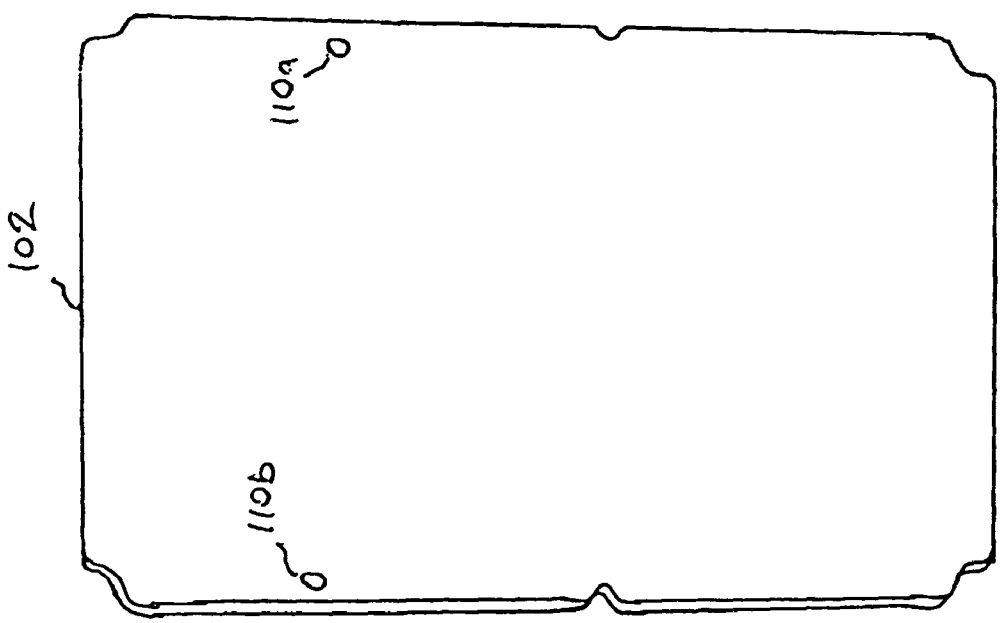
FIG. 3 is a front plan view of the motherboard of the handheld computing device.

FIG. 3 depicts the physical structure of the motherboard 102. As discussed above, the communication subsystem 111 (including the receiver 112, transmitter 114, and antenna elements 116, 118), flash memory 124, RAM 126, I/O subsystems 128, serial port 130, keyboard 132, speaker 134, microphone 136, microprocessor 138, and the subsystems 140, 142 are provided on the motherboard 102.

Figure 4:
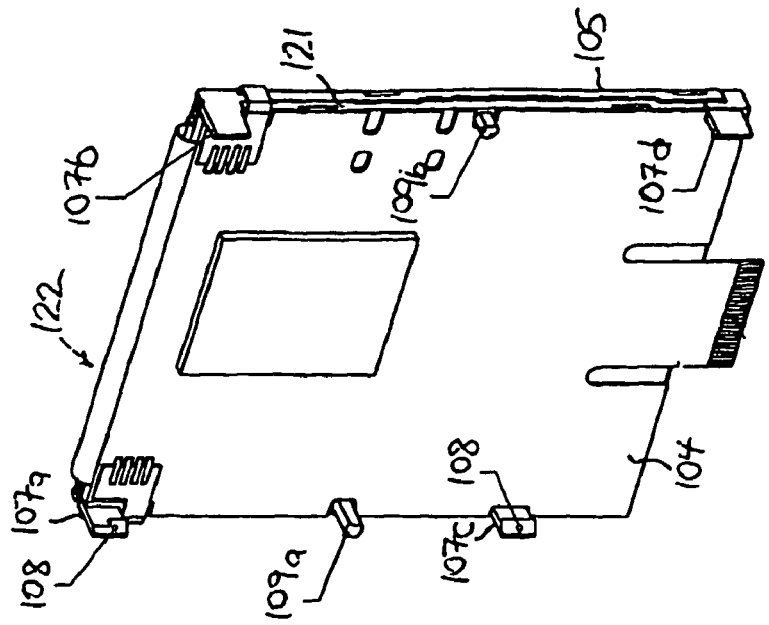
FIG. 4 is a rear perspective view of the LCD display of the handheld computing device.
Figure 7:
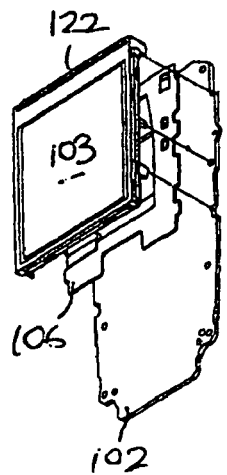
FIG. 7 is an exploded view showing the LCD display relative to the motherboard.
Figure 8:
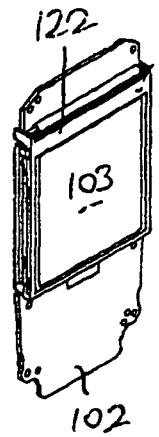
FIG. 8 is a perspective view of the LCD display secured to the motherboard.

FIG. 4 is a rear perspective view of the display 122. The display 122 is provided as a self-contained unit that is physically mounted, and electrically connected, to the motherboard 102. The display 122 includes a display panel 103 (see FIG. 7), and a printed circuit board 104 that carries the display electronics. The printed circuit board 104 may be provided as a rigid, flexible or semi-rigid circuit board. Preferably, the display panel 103 comprises a glass LCD display panel Alternately, however, the display panel 103 may comprise a plastic LCD display panel.

The display panel 103 and the display circuit board 104 are retained together within a cover assembly 105 that secures the display panel 103 to the display circuit board 104. Preferably, the cover assembly 105 comprises a front metal cover plate, and a rear metal cover plate that is coupled to the front cover plate. In addition to securing the display panel 103 to the display circuit board 104, the front and rear metal cover plates provide ESD protection for the display panel 103 and the display circuit board 104.

Figure 5:
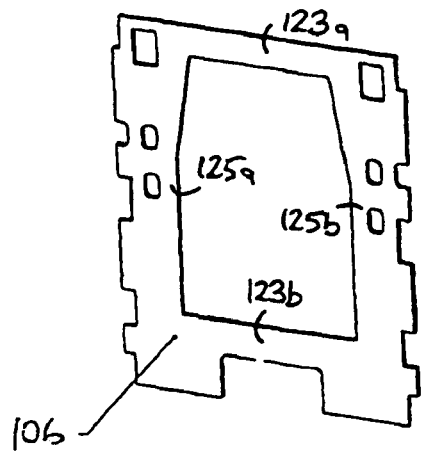
FIG. 5 is a perspective view of the resilient layer of the LCD display.

The display 122 also includes a resilient layer 106 (see FIG. 7) that is disposed between the circuit board 104 and the motherboard 102. As shown in FIG. 5, the resilient layer 106 includes an upper horizontal end 123a, a lower horizontal end 123b, and a pair of vertical sides 125a, 125b extending between the horizontal ends 123a, 123b. The resilient layer 106 has a first adhesive surface that adheres the resilient layer 106 to the circuit board 104, and a second adhesive surface that adheres the resilient layer 106 to the motherboard 102. Typically, the first adhesive surface is a permanent adhesive surface, and the second adhesive surface is a removable adhesive surface, although the properties of the first and second adhesive surfaces could be reversed. Alternately, however, both the first and second adhesive surfaces could comprise removable or permanent adhesive surfaces, if desired.

Figure 6:
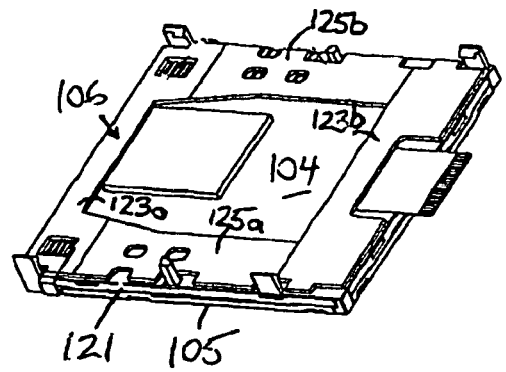
FIG. 6 is a perspective view of the LCD display, fitted with the resilient layer.

Preferably, the second adhesive surface comprises a repositional adhesive that is provided only at selected locations on the second adhesive surface so as to allow for easier removal of the display 122 from the motherboard 102. In particular, as shown in FIG. 6, preferably the repositional adhesive is disposed along the upper and lower horizontal ends 123 of the resilient layer 106, but not along the vertical sides 125. Alternately, the repositional adhesive may be disposed along the vertical sides 125 of the resilient layer 106, but not along the upper horizontal end 123. Other configurations for the repositional adhesive will be apparent. For instance, the repositional adhesive may be disposed at the corners of the resilient layer 106.

Preferably, the resilient layer 106 comprises a slow rebound urethane foam layer that absorbs shear and impact forces. The resilient layer 106 is selected such that when the display 122 is adhered to the motherboard 102, and shear and impact forces are applied to the display panel 103, the resilient layer 106 absorbs those forces and thereby limits the likelihood of the display panel 103 becoming damaged.

In addition to the resilient layer 106, the display 122 also includes a backlight (not shown), and a light guide frame 121 that is disposed between the backlight and the display panel 103. The backlight and the light guide frame 121 are sandwiched between the front and rear cover plates of the cover assembly 105. The front and rear cover plates include locking tabs (not shown) that fasten the front and rear metal cover plates to the light guide frame 121. From front to back, the display 122 comprises the front cover plate, the display panel 103, one pair of orthogonal brightness enhancing films, a light diffuser film, the light guide frame 121, the backlight, a light reflective plate, the printed circuit board 104 and the rear cover plate.

The light guide frame 121 includes two pairs of snap clips 107a, 107b, 107c, 107d that extend towards the motherboard 102, and assist in securing the display 122 to the motherboard 102 of the handheld computing device. 100. The snap clips 107 include laterally-opposed head portions 108 that loosely engage the opposing edges of the motherboard 102 so as to allow the display 122 to move towards or away from the motherboard 102, within a limited range as defined by the snap clips 107.

Preferably, the light guide frame 121 also includes a pair of pins 109a, 109b that extend towards the motherboard 102. The pins 109a, 109b are received in correspondingly-located holes 110a, 110b that are formed in the motherboard 102, and serve to align the display 122 with the motherboard 102. The holes 110 are slightly oversized so as to allow the display 122 to move laterally relative to the motherboard 102, within a limited range as defined by the snap clips 107 and the size of the holes 110. Although the light guide frame 121 is shown having two pairs of snap clips 107, and a pair of pins 109, it should be understood that the light guide frame 121 may have any number of the clips 107 and the pins 109, as required by the dimensions and shape of the display 122.

The display 122 is mounted to the motherboard 102 by aligning the pins 109a, 109b with the locate holes 110 on the motherboard 102, and then pressing the display 122 against the proximate surface of the motherboard 102, so that the second adhesive surface of the resilient layer 106 adheres to the motherboard 102. At the same time, the snap clips 107 loosely engage the edges of the motherboard 102, with the associated head portions 108 loosely engaging the opposite surface of the motherboard 102.

When the display 122 is mounted to the motherboard 102, the display 122 is resiliently mounted to the mother board 102, in that the resilient properties of the resilient layer 106 allows the display 122 to move slightly (towards, away, and laterally) relative to the motherboard 102. As a result, if the handheld computing device 100 is struck or dropped, the impact forces applied to the display panel 103 will be less than prior art computing devices. Accordingly, the likelihood of the display panel 103 of sustaining damage from such an impact is reduced.

For a handheld computing device 100 which has a 2.2 inch LCD display 122 (with a module thickness of 3.2 mm), favourable drop test characteristics (at a drop height up to one metre) can be obtained using a 0.53 mm resilient layer 106 thickness of Rogers Corporation PORON (trademark) cellular, extra soft, slow rebound PET-supported urethane foam P/N 4790-92-25021-04. The PET-supported side of the resilient layer 106 is coated with a 0.051 mm of 3M 9667, 467MP or 467MPF permanent adhesive, and the other side is selectively coated with 0.063 mm of Adchem 8311 M-74 low tack removable adhesive. As will be apparent, for a larger LCD display 122 (or a thinner, more fragile LCD display 122), the thickness of the resilient layer 106 would be increased.

A number of factors (such as the size and mass of the display 122 and the environment in which the handheld computing device 100 will be used) will dictate the characteristics of the resilient layer 106, the adhesives applied to the resilient layer 106. For example, to facilitate ease of disassembly (eg. for repair purposes), the surface area over which the repositional adhesive is applied to the resilient layer 106 should be as small as possible. On the other hand, the surface area over which the permanent and repositional adhesives are applied to the resilient layer 106, and the adhesive characteristics of the adhesives that are applied to the resilient layer 106, should be selected so that the display 122 will not become dislodged from the motherboard 102 when the handheld computing device 100 is exposed to impact forces typical of those encountered during use of the handheld computing device 100.

To reduce the likelihood of impact damage to the display panel 103, preferably the adhesives are applied symmetrically to the resilient layer 106, and the resilient layer 106 itself has a symmetrical shape, so as to cause the impact forces to be applied uniformly to the display panel 103. Further, since there are no compression forces from the front cover plate to balance the rear support forces from the rear cover plate at the centre of the display panel 103, preferably the resilient layer 106 has a hole cut in its centre to thereby support the display panel 103 at its outer edges.

The present invention is defined by the claims appended hereto, with the foregoing description being merely illustrative of a preferred embodiment of the invention. Those of ordinary skill may envisage certain modifications to the foregoing embodiments which, although not explicitly discussed herein, do not depart from the scope of the invention, as defined by the appended claims.

The invention claimed is:

1. A display for a handheld computing device, comprising:
   a LCD display panel;
   a display circuit board carrying display electronics for the display panel;
   a cover assembly securing the display panel to the display circuit board; and
   a resilient layer disposed between the display circuit board and a circuit board of the computing device, the resilient layer being configured to support the display panel and to limit impact forces applied to the display panel.

2. The display according to claim 1, wherein the resilient layer is configured to cause the applied impact forces to be applied substantially uniformly to the display panel.

3. The display according to claim 2, wherein the resilient layer comprises a urethane foam layer.

4. The display according to claim 2, wherein the resilient layer is configured to limit the support of the display panel at the centre of the display panel.

5. The display according to claim 4, wherein the display further includes a backlight, and a light guide frame disposed between the backlight and the display panel, the light guide frame including at least one snap clip for loosely engaging an edge of the circuit board of the computing device.

6. The display according to claim 5, wherein the light guide frame has at least one guide pin for aligning the display with the circuit board of the computing device, the guide pin being oriented for receipt within a corresponding hole of the circuit board of the computing device and being dimensioned to facilitate the relative movement.

7. The display according to claim 2, wherein the resilient layer has an opening proximate its centre region for supporting the display panel only along the outer peripheral region of the display panel.

8. The display according to claim 2, wherein the display further includes a backlight, and a light guide frame disposed between the backlight and the display panel, the light guide frame including at least one snap clip for securing the display to the circuit board of the handheld computing device, the at least one snap clip being configured to allow the display to move relative to the circuit board of the computing device.

9. The display according to claim 1, wherein the resilient layer has a first adhesive surface adhering the resilient layer to the display circuit board, and a second adhesive surface for adhering the display to the circuit board of the computing device, one of the adhesive surfaces being configured to cause the impact forces to be applied substantially uniformly to the display panel.

10. The display according to claim 9, wherein the one adhesive surface comprises adhesive disposed symmetrically along the one adhesive surface.

11. The display according to claim 10 wherein the adhesive is disposed at opposite ends of the one adhesive surface.

12. A handheld computing device comprising:
 a motherboard; and
 a display resiliently secured to the motherboard, the display comprising:
  a LCD display panel;
  a display circuit board carrying display electronics for the display panel;
  a cover assembly securing the display panel to the display circuit board; and
  a resilient layer disposed between the display circuit board and the motherboard, the resilient layer being configured to support the display panel and to limit impact forces applied to the display panel.

13. The handlielld computing device according to claim 12, wherein the resilient layer is configured to cause the applied impact forces to be applied substantially uniformly to the display panel.

14. The handheld computing device according to claim 13, wherein the resilient layer comprises a urethane foam layer.

15. The handheld computing device according to claim 13, wherein the resilient layer is configured to limit the support of the display panel at the centre of the display panel.

16. The handheld computing device according to claim 15, wherein the display further includes a backlight, and a light guide frame disposed between the backlight and the display panel, the light guide frame including at least one snap clip loosely engaging an edge of the motherboard.

17. The handheld computing device according to claim 16, wherein the light guide frame has at least one guide pin aligning the display with the circuit board of the computing device, the guide pin being received within a corresponding hole of the motherboard and being dimensioned to facilitate the relative movement.

18. The handheld computing device according to claim 13, wherein the resilient layer has an opening proximate its centre region for supporting the display panel only along the outer peripheral region of the display panel.

19. The handheld computing device according to claim 13, wherein the display further includes a backlight, and a light guide frame disposed between the backlight and the display panel, the light guide frame including at least one snap clip securing the display to the motherboard, the at least one snap clip being configured to allow the display to move relative to the motherboard.

20. The handheld computing device according to claim 12, wherein the resilient layer has a first adhesive surface adhering the resilient layer to the display circuit board, and a second adhesive adhering the display to the motherboard, one of the adhesive surfaces being configured to cause the impact forces to be applied substantially uniformly to the display panel.

21. The handheld computing device according to claim 20, wherein the one adhesive surface comprises adhesive disposed symmetrically along the one adhesive surface.

22. The handheld computing device according to claim 21, wherein the adhesive is disposed at opposite ends of the one adhesive surface.

* * * * *